Dec. 27, 1955   L. G. EHMANN   2,728,208
FLEXIBLE SHAFT COUPLING
Filed May 4, 1951   3 Sheets-Sheet 1

INVENTOR.
Leslie G. Ehmann
BY
Cook and Schermerhorn
ATTORNEYS

Dec. 27, 1955        L. G. EHMANN        2,728,208

FLEXIBLE SHAFT COUPLING

Filed May 4, 1951        3 Sheets-Sheet 2

INVENTOR.
Leslie G. Ehmann
BY
Cook and Schermerhorn
ATTORNEYS

INVENTOR.
Leslie G. Ehmann
BY
Cook and Schermerhorn
ATTORNEYS

United States Patent Office 2,728,208
Patented Dec. 27, 1955

2,728,208

FLEXIBLE SHAFT COUPLING

Leslie G. Ehmann, Portland, Oreg.

Application May 4, 1951, Serial No. 224,645

9 Claims. (Cl. 64—11)

This invention relates to improvements in flexible shaft couplings.

One object of the invention is to provide a resilient coupling assembly which can be readily installed as a replacement for a conventional coupling with minimum effort and expense.

Another object is to provide improved forms of resilient couplings, particularly for certain types of installations where conventional couplings cannot be used or would be difficult to install.

Another object is to provide an improved coupling for transmitting torque and thrust loads in opposite directions.

Another object is to provide a coupling assembly having means to compensate for machining tolerances in the metal parts.

Another object is to provide a coupling having means to adjust the resilience of the torque and thrust connection between two shafts.

Another object is to provide a shaft coupling employing resilient bushings where the torque load is transmitted through the coupling by shear stress in said bushings.

Another object is to provide a shaft coupling which permits axial adjustment of the two coupling members relative to each other.

Another object is to provide a shaft coupling employing a locking ring to hold the parts in assembled relation.

The present invention pertains chiefly to flexible shaft couplings which are adapted to sustain both torque and thrust loads as in the case of a marine propeller shaft. In accordance with the objects of the invention, certain forms of couplings are disclosed especially for convenient replacement purposes and other forms are designed to satisfy certain space limitations which would exclude conventional types. Other embodiments are designed for various applications to shafts requiring provision for slight end movement and to shafts required to rotate at high speeds.

The invention will be better understood and additional objects and advantages will become apparent from the following description taken in connection with the accompanying drawings. The invention is shown in its preferred forms, but it is to be understood, however, that still other forms may be apparent to persons skilled in the art.

A first form of the invention is adapted to be installed in a conventional, rigid shaft coupling to convert it into a resilient coupling which will assume torque loads in either direction of rotation, as well as thrust loads in both directions. This form of coupling is especially useful for connecting a drive shaft and a propeller shaft in a marine power unit, and is capable of lateral adjustment for accurately aligning the shafts to reduce vibration stresses on rotating parts.

Figure 1:
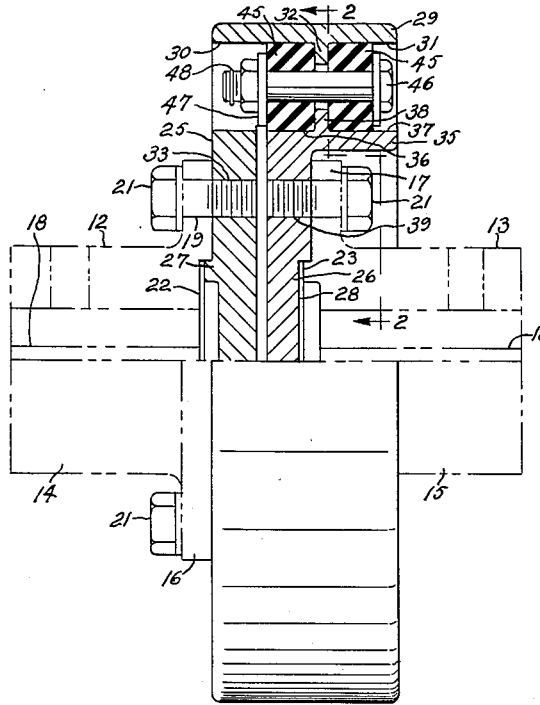
Figure 1 is a side elevation view of one form of resilient coupling showing a part of the coupling in section.
Figure 2:
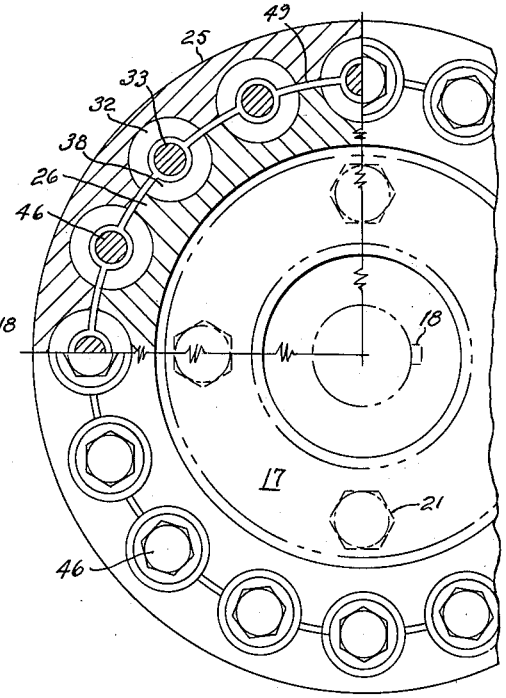
Figure 2 is an end view of the coupling of Figure 1 with a part shown in section on the offset line 2—2 of Figure 1.
Figure 3:
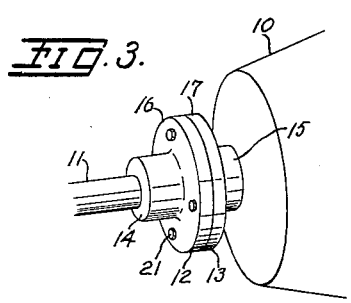
Figure 3 is a perspective view of a conventional rigid, flanged coupling connecting two shafts wherein it is desired to install the resilient coupling assembly of Figure 1.
Figure 4:
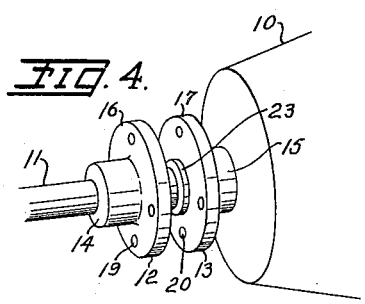
Figure 4 is a perspective view of the coupling of Figure 3, showing the flanged coupling members spread apart for insertion of the assembly of Figure 1.
Figure 5:
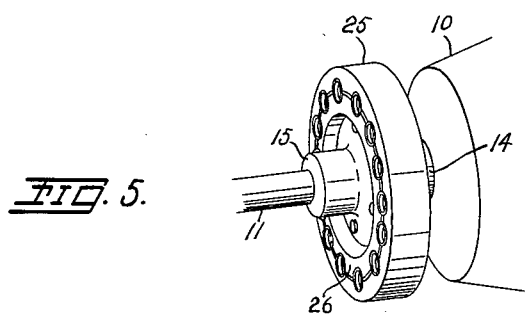
Figure 5 is a perspective view showing the coupling of Figure 1 installed between the conventional flanged coupling members of Figures 3 and 4.

Referring now to the drawings, Figures 1 to 5 show the first form of the invention and its application to a rigid, flanged coupling of conventional design. Such a rigid, flanged coupling is best seen in Figures 3 and 4, where it is connected between a driving shaft from a gear reduction unit 10 and a driven propeller shaft 11. This type of coupling comprises two members 12 and 13, each having hubs 14 and 15 carrying annular flanges 16 and 17. The hubs are each provided with a keyway 18, Figure 1, for securing the hubs to their respective shafts. The flanges 16 and 17 have holes 19 and 20, respectively, to receive studs or bolts 21 for securing the two members together. The member 12 is usually provided with an annular recess 22, Figure 1, to fit a boss 23 formed on member 13. In such a rigid conventional coupling, it is evident that no means are provided to absorb shock and vibration, or any means to accommodate misalignment of the shafts to avoid excessive vibration and possible damage to the shaft bearings. The form of the invention shown in Figures 1, 2 and 5 is intended to be installed between the two members of such a coupling to reduce to a minimum the undesirable features pointed out.

As seen in Figures 1 and 2, the invention comprises two circular flanged plates 25 and 26, the inner plate 26 being of a smaller diameter and fitting within the outer plate 25. The outer plate 25 is provided with a boss 27 to fit in recess 22 of the coupling member 12, and the plate 26 is provided with a recess 28 to receive boss 23 of the other coupling member 13. The plate 25 has an annular flange 29 provided with semicylindrical recesses 30 and 31 on its inside surface which extend from opposite ends of the flange and leave intermediate web portions 32. The recesses 30 extend through plate 25 as portions of circular holes. A series of tapped holes 33 are provided in the flanged plate 25 and align with holes 19 to receive studs 21 to secure the two members together.

Plate 26 has a flange 35 also provided with semicylindrical recesses 36 and 37 which similarly extend from the ends of the flange to leave intermediate web portions 38. All of the recesses 30, 31, 36 and 37 are of the same radial dimension, and when the two plates are assembled the recesses are paired to form divided cylindrical receptacles or chambers, with web portions 32 and 38 in a common plane, as shown in Figure 2. Tapped holes 39 in the flanged plate 26 align with holes 20 to receive studs 21 to secure the two members together.

Resilient bushings 45 are inserted in the chambers just described and seat against opposite sides of the web portions 32 and 38. The bushings 45 are held in firm engagement with the webs by cap screws 46 provided with suitable washers 47 and a nut locking ring 48.

In this form of the invention, the torque load between the driving shaft and the driven shaft is transmitted through the resilient bushings 45. The cap screws 46 may be tightened on the rubber to deform the bushing sufficiently to take either heavy or light torque loads. Also, it is to be noted that the outside diameter of the inner flange plate 26 is slightly less than the inside diameter of the outer plate 25, forming an annular gap 49 or space between the two plates. When the cap screws are tightened on the resilient bushings, the bushings firmly grip the recess walls of the two plate members to establish the desired resilient connection. Upon further tightening, the bushings are deformed to project out into the space 49. Torque in either direction of rotation of the shaft is transmitted by shear stress through all the resilient bushings. Thrust loads are transmitted in both directions, as when used on a marine propeller shaft, by the firm engagement of the bushings 45 with the abutment webs 32 and 38.

The above described form of construction allows for relative lateral adjustment of the two plates 25 and 26 to compensate for machining tolerances resulting in a certain amount of eccentricity or unbalance which would otherwise affect the alignment of the two shafts. By tightening the screws 46 more on one side of the axis of the coupling than the other, the inner plate 26 may be shifted toward the other side as may be necessary to restore precise balance and alignment. As certain bushings are shortened, they expand laterally, tending to widen the gap 49 on that side of the shafts. The equal compression on opposite bushings is still maintained as the movement of the hub automatically balances the bushing pressure to those bushings.

The Figure 1 embodiment is easily installed on the conventional rigid coupling by first removing the studs 21 and spreading the two members 12 and 13 a short distance apart, as in Figure 4. The inner and outer flange plates 25 and 26 of an assembled resilient coupling are placed between the parts 12 and 13 and the studs 21 are reinserted to engage the tapped holes of the plates through aligned holes in the hub flanges. After the unit is thus installed as shown in Figure 5, the cap screws 46 are tightened to adjust the flexibility or softness of the coupling, depending on the torque load to be handled. The cap screws are also tightened additionally on one side of the coupling as required to balance the two plates in the manner hereinbefore described.

The peripheral arrangement of the bushings permits installation between the two conventional coupling members without the usual procedure of shortening one of the shafts. When applied to a marine drive unit it is not necessary to remove the boat from the water, as the installation can be done in the boat in a minimum time and at a minimum expense.

In the manufacture of the coupling of Figure 1 as new equipment rather than as a replacement or addition to a rigid coupling, it is within the contemplation of the invention to cast the hub 14 and the plate 25 as an integral unit, and, similarly, the hub 15 and plate 25, to reduce to a minimum the number of parts.

Figure 6:
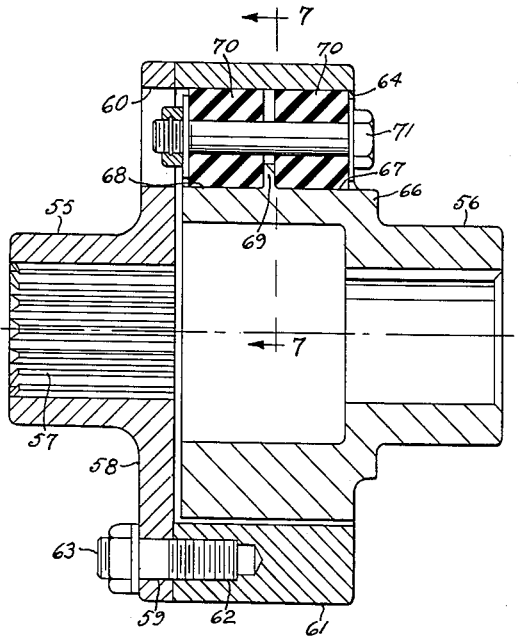
Figure 6 is a longitudinal sectional view of another embodiment of the invention.
Figure 7:
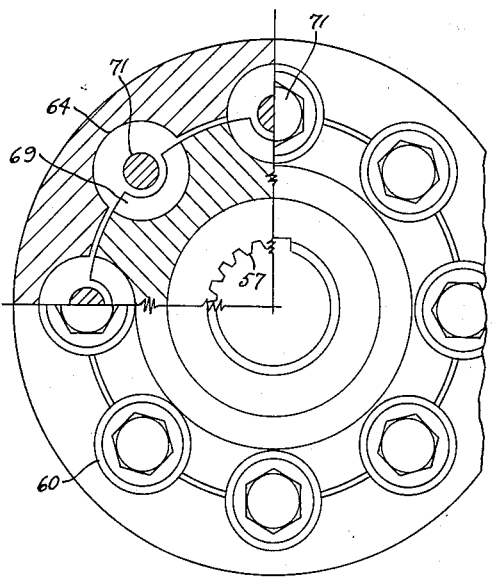
Figure 7 is an end view, partly in section, of the embodiment of Figure 6, taken on the line 7—7 thereof.

Figures 6 and 7 show an alternative form of flexible shaft coupling designed for applications where there is no thrust load and it is desired to allow for a certain amount of end movement, as in an engine supercharger drive connection. This embodiment comprises hubs 55 and 56 having splines 57 for mounting on the shafts to be connected. The hub 55 has flange 58 which is provided with holes 59 and 60. An annular ring 61 is provided with tapped holes 62 and is secured to the flange 58 by studs 63 passing through holes 59 and engaging the threads of holes 62. Semicylindrical recesses 64 are formed in the inner surface of the ring 61 corresponding in number and position to the holes 60 in the flange 58.

The hub 56 has an annular flange 66 which is of such diameter as to be contained loosely within the ring 61. The flange 66 is provided with a series of semicylindrical recesses 67 on one end and a corresponding number of recesses 68 on the other end, each pair of recesses terminating short of each other to leave web portions 69. The recesses 67 and 68 register with recesses 64 to form substantially cylindrical recesses for the insertion of rubber bushings 70. Bushings 70 are seated against webs 69 and are held in engagement therewith by cap screws 71 passing through the bushings.

It is to be noted that the recesses 64 extend the full width of the ring 61 and webs are thus not provided on the inner surface of the ring. While the bushings are held firmly relative to the flange 66 by webs 69, the ring 61 and hub 55 are free to move slightly to allow for relative end movements of the shafts. In this embodiment, as in Figure 1, the "softness" of the coupling may be controlled by the amount of tightening of screws 71, and unbalance and misalignment of the coupling parts may be corrected by increased tightening of these screws on one side of the coupling.

Figure 8:
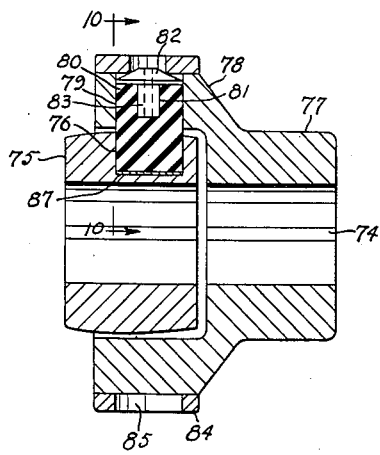
Figure 8 is a longitudinal sectional view of another embodiment which is of a quick change type.
Figure 9:
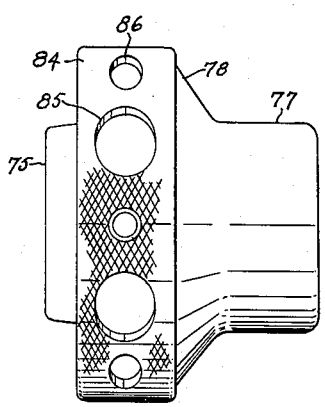
Figure 9 is a side elevation view of the embodiment of Figure 8.
Figure 10:
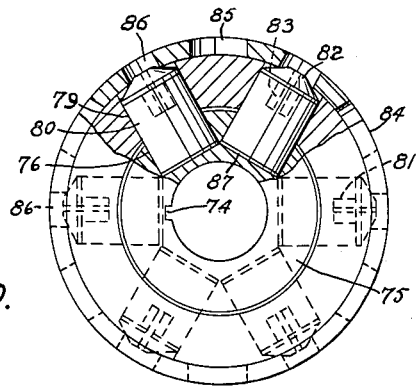
Figure 10 is an end view of the embodiment of Figures 8 and 9 with a portion in section on the line 10—10 of Figure 8.

Figures 8 and 9 show another form of flexible shaft coupling which is especially easy to assemble or disassemble. No bolts or screws are employed and the device is assembled by merely imparting a locking movement to one of the parts. To accomplish this object an inner hub 75 is provided which has a series of radial bores 76 in its outer periphery. A second hub 77 has an annular flange 78 with radial bores 79 therethrough corresponding in number and diameter to bores 76 in the hub 75. As seen in Figure 8, cylindrical rubber blocks 80 are fitted into the bores 79 and 76 of the outer and inner hubs, respectively, and provide resilient connection between the two hubs to impart torque between a driving and driven shaft. Key or spline grooves 74 are provided in the hubs for connection with the two shafts, not shown.

The resilient blocks 80 each have a central bore 81. Compression buttons are provided, each having an enlarged conical head 82 engaging the top surface of the resilient block and a shank 83 extending into the bore 81. A locking ring 84 has a series of alternating large and small openings 85 and 86. The openings 85 are of a diameter slightly greater than the diameter of the resilient blocks so that the resilient blocks can be inserted in the bores of the two hubs through the holes 83 when the ring is mounted around the flange 78 and the bores 79 and 76 are axially aligned.

To secure the two hubs together, the ring 84 is first slipped around the flange 78 and the ring rotated so that openings 83 are axially aligned with bores 79 and 76. The resilient blocks and the compression buttons are inserted, and, to lock the parts in position, the ring is rotated until the smaller holes 86 engage the heads 82 of the compression buttons, as seen in Figure 8. The openings 82 are substantially smaller than the heads of the compression buttons and the rubber blocks are of sufficient length to maintain firm engagement between the buttons and ring 84. Conical heads 82 center the openings 86 thereon and serve to retain the ring on the coupling. Shims 87 may be inserted in the bottoms of bores 76 to increase the end compression on the rubber blocks and expand them laterally into tight fitting engagement with the walls of bores 76 and 79. In relaxed condition the blocks 80 preferably fit these bores loosely for easy insertion and removal.

In the Figure 8 embodiment it will be observed that both torque and thrust loads are transmitted through the resilient blocks in pure shear stress without tension or compression on the blocks. Eccentricity is compensated by inserting more shims 87 on one side of the coupling to restore alignment of the two shafts when necessary.

Figure 11:
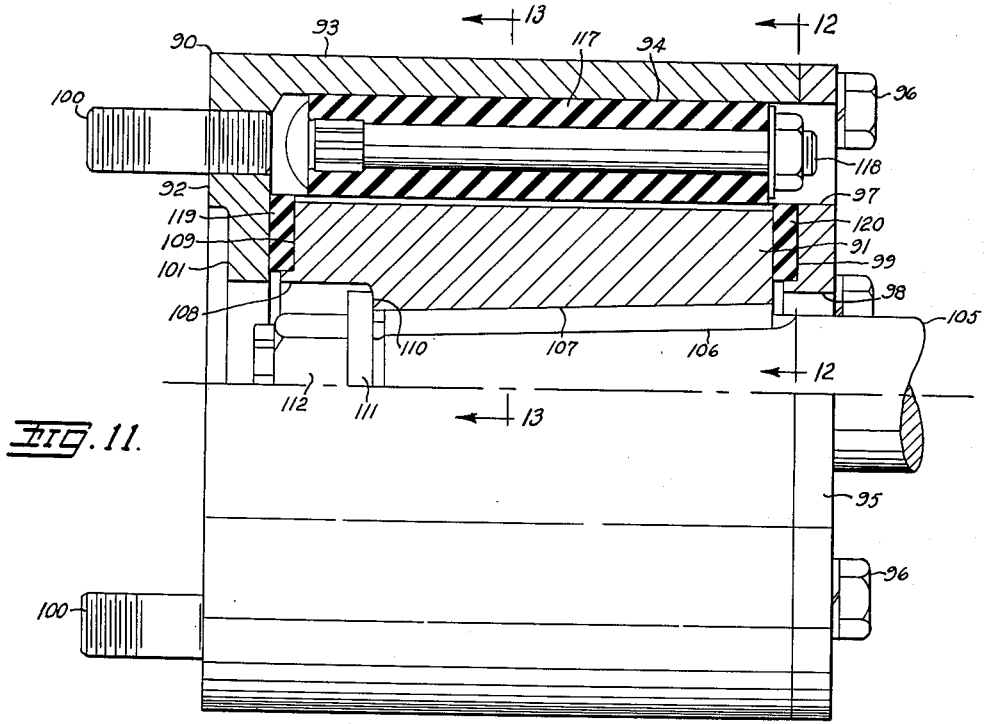
Figure 11 is a side elevation view, partly in section, of still another form of coupling which is designed for high speed and heavy torque and thrust loads.
Figure 12:
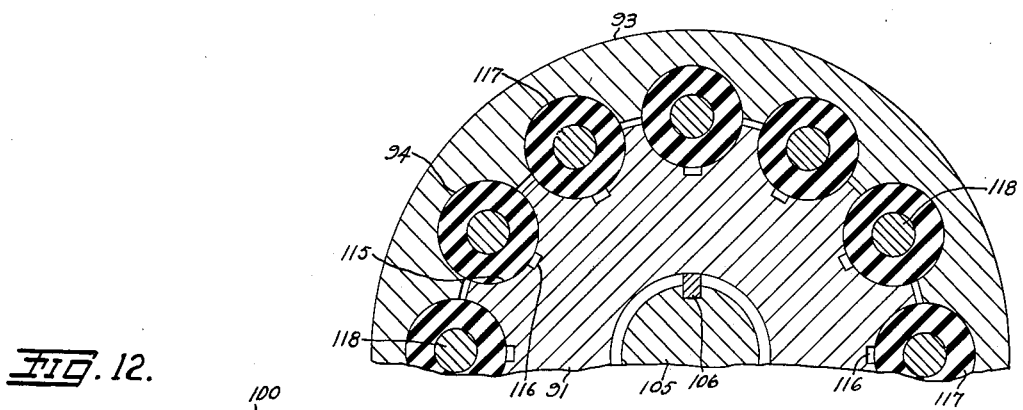
Figure 12 is a fragmentary sectional view taken on the line 12—12 of Figure 11.
Figure 13:
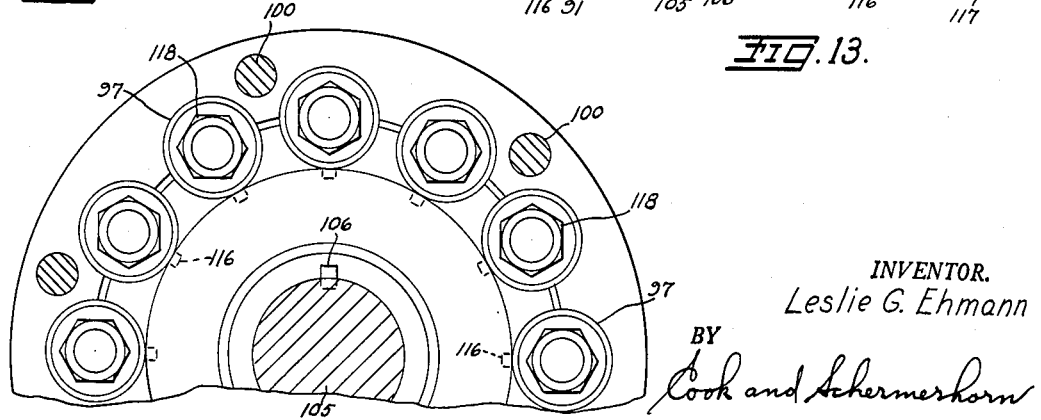
Figure 13 is a fragmentary sectional view taken on the line 13—13 of Figure 11.

The embodiment shown in Figures 11 to 13 is a small diameter coupling designed for heavy torque loads and heavy thrust loads, and, due to its small diameter, is also especially adapted to high speed shafts. The device comprises an outer housing 90 and an inner hub 91. The housing 90 has end wall 92 carrying an integral annular flange 93 provided with a series of semicylindrical recesses 94. An end plate 95, bolted to the free end of the flange by bolts 96, is provided with a corresponding number of holes 97 adjacent its periphery. This plate has a central opening 98 to receive a shaft when the device is installed, and also has an annular recess 99 on its inside surface. End wall 92 has a series of tapped holes to receive studs 100 which secure the housing to a flanged coupling, as, for example, the flanged coupling member 13 shown in Figures 3 and 4. The end wall 92 also has a recess 101 for receiving boss 22 of a flanged coupling member, Figure 4, when the members are secured together.

The inner hub 91 is keyed to a shaft spindle 105 by a key 106 and is formed with a tapering inner surface 107 to conform with the taper of the spindle 105. Hub 91 is provided with a counter bore 108 and an annular recess 109. The counter bore 108 provides an abutment 110 for a washer 111 held on the spindle by a nut 112 threaded on the end of the spindle, and the hub 91 is thus held securely on the spindle.

Hub 91 is provided with a series of semicylindrical recesses 115, Figure 13, on its outer periphery, corresponding in size and number to recesses 94 on the inside surface of the flange 93. Each of the recesses 115 has a longitudinal groove 116 on its lower surface. When the recesses 115 and 94 are in register, substantially cylindrical chambers are formed for the insertion of rubber bushings 117. Bolts 118 extend through the bushings 117 and may be tightened on the bushings, as desired, for the purpose of varying the gripping effect of the rubber bushings on the metal members. Tightening of the bolts 118 will deform the rubber bushings and, in a tight connection, the rubber will be forced into the grooves 116 as well as into the clearance space between the flange 93 and hub 91 to insure a positive grip.

To provide for heavy thrust loads, annular thrust pads 119 and 120 are contained in recesses 109 and 99, respectively, between the two coupling members. The thrust pad 119 provides a resilient abutment between the two coupling members in one direction of thrust, as when thrust is transmitted to the right in Figure 11, and the thrust pad 120 provides a resilient abutment between the two coupling members in a reverse direction. Pads 119 and 120 thereby assume thrust loads in direct compression while bushings 117 assume torque loads in shear.

Having now described my invention and in what manner the same may be used, what I claim as new and desire to protect by Letters Patent is:

1. A flexible shaft coupling comprising concentric inner and outer members, registering recesses in said members defining chambers spaced circumferentially around the coupling, thrust abutments on at least one of said members projecting into said chambers, blocks of resilient material in said chambers engaging opposite sides of said abutments and the walls of said recesses to interconnect said members, and individually adjustable means engaging each of said blocks to compress said blocks in said chambers to different degrees as desired.

2. A coupling as defined in claim 1 wherein both of said concentric members are equipped with integral abutments extending into said recesses of the respective members and disposed in a common plane between said blocks of resilient material.

3. An adjustable resilient shaft coupling comprising inner and outer concentric members, opposed semi-cylindrical recesses in said two members defining cylindrical bores extending parallel with the axis of the coupling, radially extending thrust abutments in the recesses of at least one of said members and fixed to said member, pairs of cylindrical blocks of resilient material in said bores interconnecting said members and seated against opposite sides of said abutments, and individually adjustable means engaging only said individual pairs of blocks of resilient material for compressing said blocks into binding engagement with said abutments and recesses.

4. A coupling as defined in claim 3 wherein both of said concentric members are equipped with integral abutments extending into said recesses of the respective members and disposed in a common plane between said blocks of resilient material.

5. An adjustable resilient shaft coupling comprising inner and outer concentric members, opposed semi-cylindrical recesses in said members defining cylindrical bores extending parallel with the axis of the coupling, radially extending thrust abutments in the recesses of at least one of said members and fixed to said member, pairs of cylindrical blocks of resilient material in said bores engaging opposite sides of said abutments and interconnecting said members, bolts extending longitudinally through said blocks, and abutment means on the ends of said bolts engaging only said resilient material for compressing said blocks axially and expanding them radially through a wide range of adjustment.

6. A coupling as defined in claim 5 wherein both of said concentric members are equipped with integral abutments extending into said recesses of the respective members and disposed in a common plane between said blocks of resilient material.

7. An adjustable shaft coupling for torque and thrust loads comprising a pair of inner and outer concentric members adapted for connection respectively to two shafts to be joined in axial alignment, complementary confronting recesses in said two members, thrust abutments in said recesses of at least one of said members and fixed to said member, pairs of blocks of resilient material in said recesses seated against opposite sides of said abutments, individual bolts extending through said blocks in an axial direction, and nuts on said bolts, said bolts and nuts engaging only said resilient material and being spaced from both of said members to avoid transmission of noise and vibration from one shaft to the other, and whereby the different nuts may be tightened to different degrees to expand certain of said blocks in a radial direction more than others to adjust said members for concentricity.

8. A coupling as defined in claim 7 wherein both of said concentric members are equipped with integral abutments extending into said recesses of the respective members and disposed in a common plane between said blocks of resilient material.

9. A device for reducing vibration stresses in rotating parts comprising concentric inner and outer members, means for mounting at least one of said members on said rotating part, registering recesses in said members defining chambers spaced circumferentially around said members, abutments on at least one of said members projecting into said chambers, blocks of resilient material in said chambers engaging opposite sides of said abutments and the walls of said recesses to interconnect said members, and individually adjustable means engaging each of said blocks to compress said blocks in said chambers to different degrees as desired.

References Cited in the file of this patent

UNITED STATES PATENTS

| | | |
|---|---|---|
| 1,663,803 | Link | Mar. 27, 1928 |
| 1,894,432 | Watson | Jan. 17, 1933 |
| 2,238,531 | Malmquist | Apr. 15, 1941 |
| 2,326,450 | Fawick | Aug. 10, 1943 |

FOREIGN PATENTS

| | | |
|---|---|---|
| 856,664 | France | 1940 |
| 227,654 | Switzerland | 1943 |
| 557,133 | Great Britain | 1943 |